(12) United States Patent
Schaefer et al.

(10) Patent No.: US 12,224,890 B1
(45) Date of Patent: Feb. 11, 2025

(54) INTERPOLATED DETERMINISTIC GRADIENT ADAPTIVE FILTER

(71) Applicant: BAE Systems Information and Electronic Systems Integration Inc., Nashua, NH (US)

(72) Inventors: Timothy M. Schaefer, Rochester, MN (US); David J. Couto, Pepperell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 57 days.

(21) Appl. No.: 18/446,084

(22) Filed: Aug. 8, 2023

(51) Int. Cl.
*H04L 27/34* (2006.01)
*G06N 3/084* (2023.01)
*H04L 27/148* (2006.01)

(52) U.S. Cl.
CPC .......... *H04L 27/148* (2013.01); *G06N 3/084* (2013.01)

(58) Field of Classification Search
CPC . H04L 27/34; H04L 25/4902; H04L 27/0004; H04L 27/2637; H04L 7/0008; H04L 27/18; H04L 27/0008; H04L 27/2017; H04B 3/23; H04B 2201/70703; H04B 1/707; H04B 7/0854; H04B 1/7093; H04B 2201/70707; H04B 1/69; H04B 2201/70701; H04M 9/082; H04M 9/08; H04M 3/56; H04M 1/6016; H04M 1/6033; H04M 1/62; H04M 2203/509; H04M 3/002
See application file for complete search history.

(56) References Cited

U.S. PATENT DOCUMENTS

| | | | |
|---|---|---|---|
| 6,351,740 B1 | 2/2002 | Rabinowitz | |
| 6,961,742 B2 | 11/2005 | Neretti et al. | |
| 7,023,910 B1 * | 4/2006 | Norrell | H04L 25/14 370/286 |
| 7,027,500 B1 | 4/2006 | Casas et al. | |
| 8,054,874 B2 | 11/2011 | Hidaka | |

(Continued)

FOREIGN PATENT DOCUMENTS

| | | |
|---|---|---|
| EP | 3764542 | 9/2022 |
| EP | 4156554 | 3/2023 |

(Continued)

*Primary Examiner* — Eva Y Puente
(74) *Attorney, Agent, or Firm* — Sand, Sebolt & Wernow LPA

(57) ABSTRACT

An adaptive filter protocol stored on a non-transitory computer readable medium that is operatively in communication with a processor of a platform. The adaptive filter protocol includes a first processing loop that is operatively in communication with at least one receiving device of the platform for receiving at least one input signal. The adaptive filter protocol also includes a second processing loop that is operatively in communication with the first processing loop and has a deterministic gradient descent optimization logic and an interpolation logic. When the at least one receiving device receives the at least one input signal, the adaptive filter protocol enables the processor to generate a refined match filter parameters that substantially correlates with the initial parameters of the at least one input signal upon completing a plurality of refining cycles of the second processing loop.

20 Claims, 7 Drawing Sheets

(56) References Cited

U.S. PATENT DOCUMENTS

| | | | |
|---|---|---|---|
| 9,210,012 B2 | 12/2015 | Pustovalov et al. | |
| 10,305,593 B1 | 5/2019 | Chaouch et al. | |
| 10,924,087 B2 | 2/2021 | Gao et al. | |
| 10,958,483 B1 | 3/2021 | Shahramian et al. | |
| 11,501,152 B2 | 11/2022 | Yehezkel et al. | |
| 11,581,965 B2 | 2/2023 | O'Shea et al. | |
| 11,611,457 B2 | 3/2023 | D'Oro et al. | |
| 2014/0214374 A1* | 7/2014 | Haas | G06F 30/20 703/2 |
| 2015/0229133 A1* | 8/2015 | Reynolds | H02J 7/0048 307/24 |
| 2018/0245457 A1* | 8/2018 | Eadala | H04L 25/03019 |
| 2019/0126845 A1* | 5/2019 | Tao | G10K 11/17823 |
| 2020/0191913 A1 | 6/2020 | Zhang et al. | |
| 2020/0257985 A1 | 8/2020 | West et al. | |
| 2022/0101074 A1 | 3/2022 | Peters et al. | |
| 2023/0021739 A1 | 1/2023 | Appleton et al. | |
| 2024/0214247 A1* | 6/2024 | Arikawa | H04L 25/03159 |

FOREIGN PATENT DOCUMENTS

| | | |
|---|---|---|
| WO | 2016202516 | 12/2016 |
| WO | 2023274495 | 1/2023 |

\* cited by examiner

INTERPOLATED DETERMINISTIC GRADIENT ADAPTIVE FILTER

TECHNICAL FIELD

The present disclosure relates to an adaptive filter application, particularly an interpolated deterministic gradient adaptive filter application.

BACKGROUND ART

Electronic warfare (or EW) receivers or systems are configured to detect and classify uncooperative or unknown signals in real-time operations. In these real-time operations, these EW receivers are configured to intercept signals that are generally weak with large amounts of noise (i.e., a low signal-to-noise ratio or SNR). In one instance, pulsed linear chirp radar signals are commonly detected and classified by these EW receivers in real-time operations where the frequency might spread in a broad range. With such variance in frequency of these signals, designing suitable EW receivers that can quickly and effectively classify these uncooperative or unknown signals in real-time operations is needed.

To combat against this difficulty, some EW warfare receivers may be used detect and classify uncooperative or unknown signals in real-time operations. In one instance, EW warfare receivers may currently use stochastic optimization methods and/or techniques when detecting and classifying uncooperative or unknown signals in real-time operations. Such use of stochastic optimization is desirable in this field given the quick computation stochastic optimization offers for EW warfare receives. While quick computation is desirable, however, the stochastic optimization approach fails to provide efficient outcomes and/or results due to the speed of computation. The stochastic optimization approach in these EW warfare may thus require vast amounts of computation iterations and/or cycles in order to classify uncooperative or unknown signals in real-time operations; as such, such speed of the stochastic optimization approach may be considered a detriment for use in EW warfare receivers and systems given the additional computation iterations and cycles during military operations.

SUMMARY

In one aspect, an exemplary embodiment of the present disclosure may provide a system. The system includes at least one receiving device adapted to receive at least one input signal having initial parameters emitted from an emitter system. The system also includes a processor that is operatively in communication with the at least one receiving device. The system also includes an adaptive filter protocol that is stored on a non-transitory computer readable medium and is operatively in communication with the processor. The adaptive filter protocol comprises a first processing loop that is operatively in communication with the at least one receiving device for receiving the at least one input signal, and a second processing loop that is operatively in communication with the first processing loop and having a deterministic gradient descent optimization logic and an interpolation logic. When the at least one receiving device receives the at least one input signal, the adaptive filter protocol enables the processor to generate a refined match filter parameters that substantially correlates with the initial parameters of the at least one input signal upon completing a plurality of refining cycles of the second processing loop.

This exemplary embodiment or another exemplary embodiment further includes that the adaptive filter protocol further comprises: a correlation logic operatively in communication with the first processing loop and the second processing loop; wherein the correlation logic is configured with a correlation threshold for determining the refined match filter parameters substantially correlates with the initial parameters of the at least one signal. This exemplary embodiment or another exemplary embodiment further includes a set of match filter parameters extracted from the initial parameters of the at least one input signal by the first processing loop; wherein the set of match filter parameters is refined by the set of refined match filter parameters to meet the correlation threshold. This exemplary embodiment or another exemplary embodiment further includes that the first processing loop comprises: a parametric extraction logic operatively in communication with the processor and the at least one receiving device, wherein the parametric extraction logic is configured to output a set of extracted parameters extracted from the initial parameters defined within a predetermined range of parameters of the adaptive filter protocol; and a match filter generator operatively in communication with the parametric extraction logic, wherein the match filter generator is configured to generate a match filter based on the set of extracted parameters. This exemplary embodiment or another exemplary embodiment further includes that the second processing loop comprises: an error/loss logic operatively in communication with the correlation logic, wherein the error/loss logic is configured to output a set of error/loss parameters based on a lack of correlation between the set of initial parameters and the set of match filter parameters; and a backpropagation logic operatively in communication with the error/loss logic, wherein the backpropagation logic is configured to compute a set of feedback parameters based on the set of error/loss parameters and the set of match filter parameters. This exemplary embodiment or another exemplary embodiment further includes that the deterministic gradient descent optimization logic comprises: a deterministic optimizer operatively in communication with the backpropagation logic, wherein the deterministic optimizer is configured to assess and output the set of initial parameters, the set of match filter parameters, and the set of error/loss parameters; a discrete variable pathway operatively in communication with the deterministic optimizer, wherein the discrete variable pathway is configured to find at least one optimal discrete variable from set of feedback parameters; a continuous variable pathway operatively in communication with one of the deterministic optimizer and the discrete variable pathway, wherein the continuous variable pathway is configured find at least one optimal continuous variable from the set of feedback parameters; and a neural network operatively in communication with one or both of the continuous variable pathway and the discrete variable pathway, wherein the neural network is configured to compute the refined match filter parameters based on the at least one optimal continuous variable and the at least one discrete variable. This exemplary embodiment or another exemplary embodiment further includes that the discrete variable pathway and the continuous variable pathway are implemented in a parallel implementation such that the continuous variable pathway and the discrete variable pathway are executed simultaneously. This exemplary embodiment or another exemplary embodiment further includes that the discrete variable pathway and the continuous variable pathway are implemented in a series implementation such the continuous variable pathway is executed subsequent to the discrete variable pathway. This exemplary embodiment or another exemplary embodiment further includes that the deterministic gradient descent optimization further comprises: an iterative optimization logic operatively in communication with the neural network and the deterministic optimizer logic; wherein the iterative optimization logic is configured to continuously send the refined match filter parameters in each refining cycle of the plurality of refining cycles from the neural network to the deterministic optimizer logic to seed the second processing loop. This exemplary embodiment or another exemplary embodiment further includes that the second processing loop further comprises: a parametric interpolation logic operatively in communication with neural network and the match filter generator; wherein the parametric interpolation logic is configured to converge the refined match filter parameters with the match filter generated by the match filter generator.

In another aspect, an exemplary embodiment of the present disclosure may provide a method. The method comprises steps of: storing an adaptive filter protocol on a non-transitory computer readable medium of a system that is operatively in communication with a processor of the system and at least one receiving device of the system, the adaptive filter protocol comprises: a first processing loop operatively in communication with the at least one receiving device of the system; and a second processing loop operatively in communication with the first processing loop and having a deterministic gradient descent optimization function and an interpolation function; effecting an input signal to be detected, via the at least one receiving device, transmitted from an emitter system; constraining the input signal, via the at least one receiving device, to a set of initial parameters; extracting the set of initial parameters, via a parametric extraction function of the first processing loop, that occupies a predetermined sampling range of the adaptive filter protocol; generating a set of match filter parameters, via a match filter generator of the first processing loop, that includes a set of extracted sampling parameters; comparing the set of match filter parameters and the set of initial parameters with one another by a correlator of the adaptive filter protocol; converging the set of match filter parameters with a set of refined match filter parameters computed by the second processing loop; comparing the set of initial parameters and the set of refined match filter parameters with one another by the correlator; and outputting the set of refined match filter parameters, wherein the set of refined match filter parameters meets a correlation threshold of the correlator.

This exemplary embodiment or another exemplary embodiment further includes that the step of converging the set of match filter parameters with a set of refined match filter parameters further comprises: outputting the set of match filter parameters from the correlator to an error/loss function of the second processing loop; computing a set of error/loss parameters, by the error/loss function, based on a lack of correlation between the set of initial parameters and the set of match filter parameters. This exemplary embodiment or another exemplary embodiment further includes that the step of converging the set of match filter parameters with a set of refined match filter parameters further comprises: outputting the set of error/loss parameters from the error/loss function to a backpropagation function of the second processing loop; and computing a set of feedback parameters, by the backpropagation function, with respect to the set of initial parameters, the set of match filter parameters, and the set of error/loss parameters. This exemplary embodiment or another exemplary embodiment further includes that the step of converging the set of match filter parameters with a set of refined match filter parameters further comprises: outputting the set of feedback parameters from the backpropagation function to a deterministic optimizer of the second processing loop; assessing the set of initial parameters, the set of extracted parameters, and the set of error/loss parameters by the deterministic optimizer; and generating a set of deterministic parameters that includes discrete variables and continuous variables based on the set of initial parameters, the set of extracted parameters, and the set of error/loss parameters. This exemplary embodiment or another exemplary embodiment further includes extracting a set of discrete parameters by a discrete variable function of a discrete variable pathway of the second processing loop; and computing at least one optimal discrete parameter, by a combinatorial optimization function of the discrete variable pathway, from the set of discrete parameters. This exemplary embodiment or another exemplary embodiment further includes extracting a set of continuous parameters by a continuous variable function of a continuous variable pathway of the second processing loop; and computing at least one optimal continuous parameter, by a gradient descent optimization function of the continuous variable pathway, from the set of continuous parameters. This exemplary embodiment or another exemplary embodiment further includes extracting a set of discrete parameters by a discrete variable function of a discrete variable pathway of the second processing loop; computing at least one optimal discrete parameter, by a combinatorial optimization function of the discrete variable pathway, from the set of discrete parameters; extracting a set of continuous parameters by a continuous variable function of a continuous variable pathway of the second processing loop; and computing at least one optimal continuous parameter, by a gradient descent optimization function of the continuous variable pathway, from the set of continuous parameters. This exemplary embodiment or another exemplary embodiment further includes that the steps of extracting the set of continuous parameters by the continuous variable function and computing the at least one optimal continuous parameter by the gradient descent optimization function are performed simultaneously with the steps of extracting the set of discrete parameters by the discrete variable function and computing the at least one optimal discrete parameter by the combinatorial optimization function or performed subsequent to the steps of extracting the set of discrete parameters by the discrete variable function and computing the at least one optimal discrete parameter by the combinatorial optimization function. This exemplary embodiment or another exemplary embodiment further includes computing the refined match filter parameters, by a neural network of the second processing loop, based on the at least one optimal continuous parameter and the at least one discrete parameter; and seeding the refined match filter parameters, via an iterative optimization function, by outputting the refined match filter parameters to the deterministic optimizer in each refining cycle of the plurality of refining cycles. This exemplary embodiment or another exemplary embodiment further includes that the step of converging the set of match filter parameters with the set of refined match filter parameters further includes that a parametric interpolation function is configured to converge the refined match filter parameters with the match filter parameters generated by the match filter generator.

In another aspect, an exemplary embodiment of the present disclosure may provide a computer program product that includes at least one non-transitory computer readable storage medium on a moving platform in operative communication with a processor and at least one receiving device engaged with the moving platform, the storage medium having instructions stored thereon, that, when executed by the processor, implement a process to determine synthesized initial parameters from an input signal emitted by an emitter system. The process comprises: constraining the input signal, via the at least one receiving device, to a set of initial parameters; extracting the set of initial parameters, via a parametric extraction function of a first processing loop, that occupies a predetermined sampling range of the adaptive filter protocol, wherein the first processing loop is in communication with the at least one receiving device; generating a set of match filter parameters, via a match filter generator of the first processing loop, that includes a set of extracted sampling parameters; comparing the set of match filter parameters and the set of initial parameters with one another by a correlator of the adaptive filter protocol; converging the set of match filter parameters with a set of refined match filter parameters computed by a second processing loop, wherein the second processing loop is operatively in communication with the first processing loop and having a deterministic gradient descent optimization function and an interpolation function; comparing the set of initial parameters and the set of refined match filter parameters with one another by the correlator; and outputting the set of refined match filter parameters, wherein the set of refined match filter parameters meets a correlation threshold of the correlator.

In yet another aspect, an exemplary embodiment of the present disclosure may provide a system. The system includes at least one receiving device that is adapted to receive at least one input signal having initial parameters emitted from an emitter system. The system also includes a processor that is operatively in communication with the at least one receiving device. The system also includes an adaptive filter protocol that is stored on a non-transitory computer readable medium and is operatively in communication with the processor. The adaptive filter protocol comprises: a first processing loop that is operatively in communication with the at least one receiving device for receiving the initial parameters of the at least one input signal; and a second processing loop that is operatively in communication with the first processing loop and having a deterministic gradient descent optimization logic and an interpolation logic that, when executed by the processor, generates synthesized initial parameters of a synthesized input signal that substantially correlates with the initial parameters of the at least one input signal upon completing a plurality of refining cycles of the second processing loop.

This exemplary embodiment or another exemplary embodiment further includes that the adaptive filter protocol further comprises: a correlation logic operatively in communication with the first processing loop and the second processing loop; wherein the correlation logic is configured with a correlation threshold for determining the refined match filter parameters substantially correlates with the initial parameters of the at least one signal. This exemplary embodiment or another exemplary embodiment further includes a set of match filter parameters extracted from the initial parameters of the at least one input signal by the first processing loop; wherein the set of match filter parameters is refined by the set of refined match filter parameters to meet the correlation threshold. This exemplary embodiment or another exemplary embodiment further includes that that the first processing loop comprises: a parametric extraction logic operatively in communication with the processor and the at least one receiving device, wherein the parametric extraction logic is configured to output a set of extracted parameters extracted from the initial parameters defined within a predetermined range of parameters of the adaptive filter protocol; and a match filter generator operatively in communication with the parametric extraction logic, wherein the match filter generator is configured to generate a match filter based on the set of extracted parameters. This exemplary embodiment or another exemplary embodiment further includes that that the second processing loop comprises: an error/loss logic operatively in communication with the correlation logic, wherein the error/loss logic is configured to output a set of error/loss parameters based on a lack of correlation between the set of initial parameters and the set of match filter parameters; and a backpropagation logic operatively in communication with the error/loss logic, wherein the backpropagation logic is configured to compute a set of feedback parameters based on the set of error/loss parameters and the set of match filter parameters. This exemplary embodiment or another exemplary embodiment further includes that the deterministic gradient descent optimization logic comprises: a deterministic optimizer operatively in communication with the backpropagation logic, wherein the deterministic optimizer is configured to assess and output the set of initial parameters, the set of match filter parameters, and the set of error/loss parameters; a discrete variable pathway operatively in communication with the deterministic optimizer, wherein the discrete variable pathway is configured to find at least one optimal discrete variable from set of feedback parameters; a continuous variable pathway operatively in communication with one of the deterministic optimizer and the discrete variable pathway, wherein the continuous variable pathway is configured find at least one optimal continuous variable from the set of feedback parameters; and a neural network operatively in communication with one or both of the continuous variable pathway and the discrete variable pathway, wherein the neural network is configured to compute the refined match filter parameters based on the at least one optimal continuous variable and the at least one discrete variable. This exemplary embodiment or another exemplary embodiment further includes that the discrete variable pathway and the continuous variable pathway are implemented in a parallel implementation such that the continuous variable pathway and the discrete variable pathway are executed simultaneously. This exemplary embodiment or another exemplary embodiment further includes that the discrete variable pathway and the continuous variable pathway are implemented in a series implementation such the continuous variable pathway is executed subsequent to the discrete variable pathway. This exemplary embodiment or another exemplary embodiment further includes that the deterministic gradient descent optimization further comprises: an iterative optimization logic operatively in communication with the neural network and the deterministic optimizer logic; wherein the iterative optimization logic is configured to continuously send the refined match filter parameters in each refining cycle of the plurality of refining cycles from the neural network to the deterministic optimizer to seed the second processing loop. This exemplary embodiment or another exemplary embodiment further includes that the second processing loop further comprises: a parametric interpolation logic operatively in communication with neural network and the match filter generator; wherein the parametric interpolation logic is configured to converge the refined match filter parameters with the match filter generated by the match filter generator.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
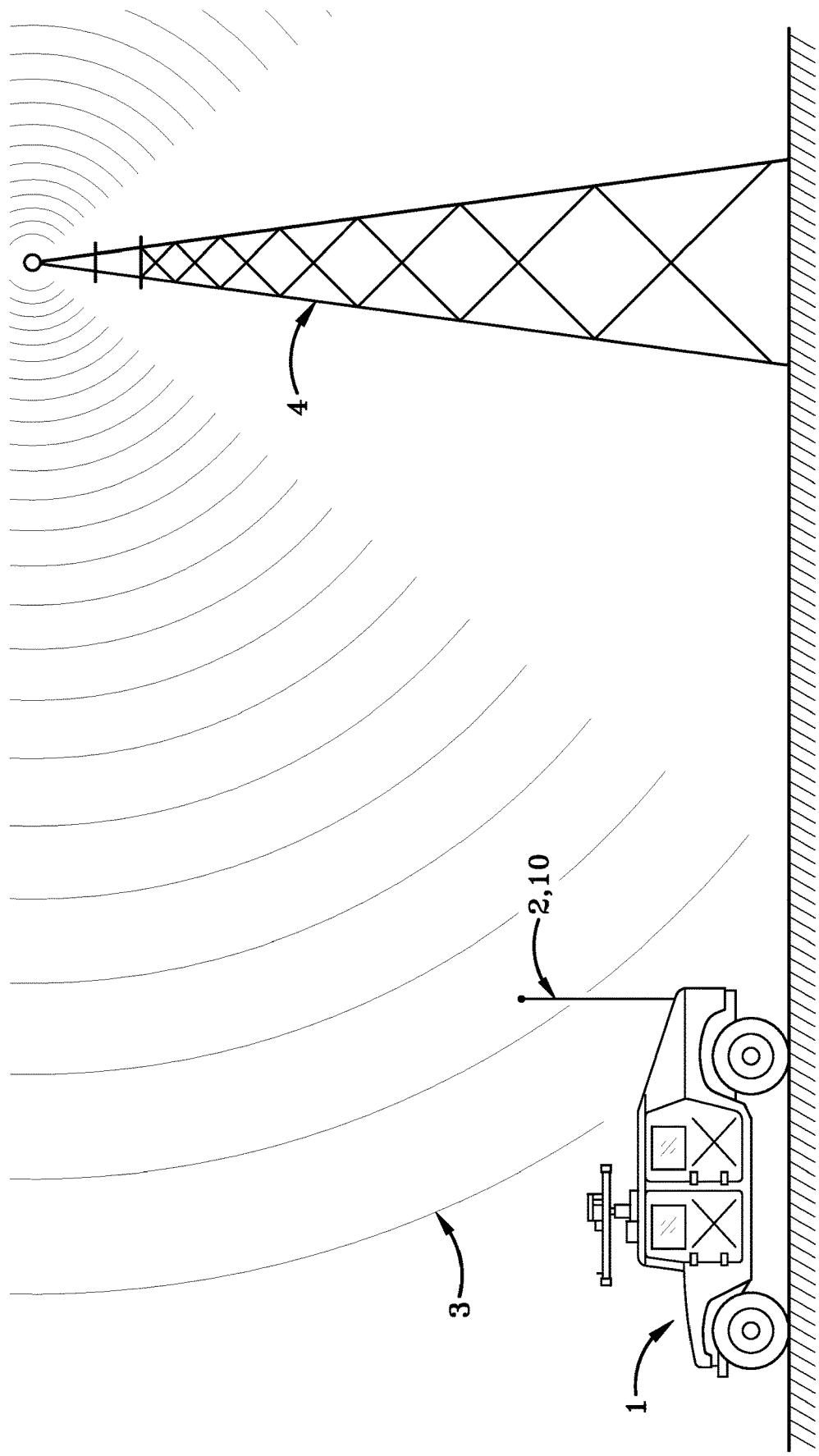
FIG. 1 (FIG. 1) is a diagrammatic view of at least one input signal outputted by an emitter and being intercepted by a platform, wherein the platform includes an adaptive filter protocol.

FIG. 1 illustrates a platform, generally referred to as reference numeral 1, equipped with at least one receiving device 2 having an antenna. In the present disclosure, the at least one receiving device 2 is configured to receive and/or intercept one or more communication signals or input signal 3 that is transmitted from an emitter system 4. The input signal 3 discussed herein is transmitted from the emitter system 4 that is unknown to the platform 1 such that the specific parameters and/or data associated with the input signal 3 is also unknown to the platform 1. As discussed in greater detail below, platform 1 includes an adaptive filter protocol that is configured to recreate the chirp or input signal 3 emitted by the emitter system 4 to interrupt and synthesize matching parametric values that make up the input signal 3.

In the present disclosure, platform 1 is represented by a manned ground vehicle that includes at least one receiving device 2 that receives and/or intercepts one or more unknown input signals 3 that are transmitted from emitter system 4. It should be understood that platform 1 discussed and illustrated herein does not limit the use and description of platform 1 and all components provided with platform 1. As such, other exemplary types of platforms that include at least one receiving device may be used for receiving and/or intercepting one or more input signals that are transmitted from an emitter system. In one example, platform may be an unmanned or autonomous vehicle (e.g., unmanned aerial vehicles or UAVs, unmanned underwater vehicles or UUVs, unmanned ground vehicles or UGVs, etc.) that includes at least one receiving device for receiving and/or intercepting one or more input signals that are transmitted from an emitter system. In another example, platform may be a manned watercraft or water vessel that includes at least one receiving device for receiving and/or intercepting one or more input signals that are transmitted from an emitter system. In yet another example, platform may be a manned aircraft or aerial vehicle that includes at least one receiving device for receiving and/or intercepting one or more input signals that are transmitted from an emitter system. In yet another example, platform may be an immobile or stationary platform (e.g., building, tower, etc.) that includes at least one receiving device for receiving and/or intercepting one or more input signals that are transmitted from an emitter system.

As discussed previously, receiving device 2 is configured to detect and intercept the analog input signal 3 or waveforms emitted in the surrounding environment of platform 1. In certain embodiments, the receiving device 2 has an RF front end coupled to the antenna that conditions the analog input signal 3 by amplifying, filtering, and/or down-converting the input signal before the signal is converted to a digital signal by an A/D converter. In the present disclosure, receiving device 2 may be equipped with a suitable filter that bounds and/or constrains the input signal 3 to initial or historical parameters (denoted by arrows labeled "A" in FIG. 2) between a start frequency, a stop frequency, and a time constraint measured between the start frequency and the stop frequency. While receiving device 2 may be equipped to constrain analog input signal 3 to the initial parameters "A", other suitable systems and/or devices provided on platform 1 may be equipped to constrain an initial signal to a set of initial or sampling parameters between a start frequency, a stop frequency, and a time constraint measured between the start frequency and the stop frequency.

In the present disclosure, emitter system 4 is also shown as an immobile and/or stationary system that transmits the one or more analog input signals 3. It should be understood that emitter system 4 discussed and illustrated herein is only one form of such emitter systems and should not limit other suitable emitter systems. In one example, emitter system may be a mobile or moveable platform that transmits one or more input signals. In this example, suitable mobile platforms include, but are not limited to, ground or land vehicles, watercrafts or water vehicles, and aircrafts or aerial vehicles. In another example, emitter system may be an unmanned or autonomous vehicle or a manned vehicle that transmits one or more input signals.

Platform 1 also includes at least one processor 6 that operably engages with the receiving device 2. For diagrammatic purposes, platform 1 herein includes a single processor 6 that operably engages with a single receiving device 2. In the present disclosure, receiving device 2 and processor 6 are connected with one another on platform 1. Such connection between the receiving device 2 and the processor 6 enables communication between the receiving device 2 and the processor 6 to perform adaptive filtering operations on the digitized input signal 3', where 3' is a digitized version of the analog input signal 3 and may also be processed by an RF front end. The digitized input signal 3' is a digital version of the analog input signal 3 following any RF front end processing and conversion via an A/D conversion. In operation, receiving device 2 is configured to convey or output the digitized input signal 3' that was emitted by emitter system 4 to processor 6 for adaptive filtering purposes, which is discussed in greater detail below.

It should be appreciated that any suitable connection may be used between the receiving device 2 and the processor 6 to allow communication between the receiving device 2 and the processor 6. In one example, the receiving device 2 and processor 6 are electrically connected with one another on platform 1 such as by a wired connection. Such connection between the receiving device 2 and the processor 6 enables electrical communication between the receiving device 2 and the processor 6 to perform adaptive filtering operations on the input signal 3. In another example, the receiving device 2 and processor 6 are connected with one another on platform 1 via a fiber optic connection. Such fiber optic connection between the receiving device 2 and the processor 6 enables the receiving device 2 to convey or send one or more digitized input signals 3' to the processor 6 to perform adaptive filtering operations on the digitized input signal 3'. In another example the receiving device 2 and processor 6 are electrically connected with one another on platform 1 such as by a wireless connection.

Figure 2:
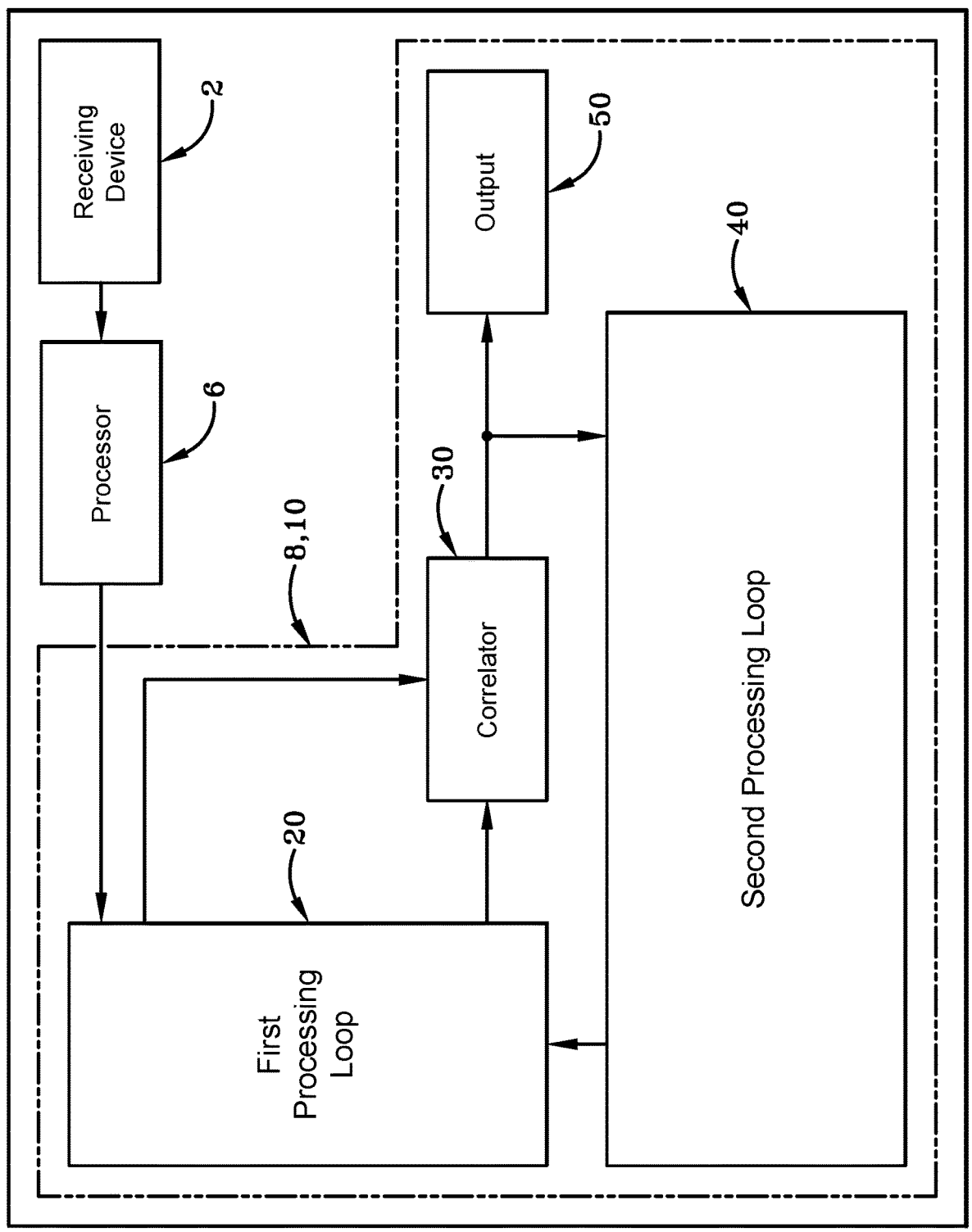
FIG. 2 (FIG. 2) is a diagrammatic flowchart of the adaptive filter protocol.

Platform 1 also includes at least one non-transitory computer readable medium that is configured to store an adaptive filtering protocol generally referred to as reference numeral 10 (see FIG. 2). As best seen in FIG. 2, platform 1 includes a single non-transitory computer readable medium that is loaded with the adaptive filtering protocol 10. In the present disclosure, processor 6 is electrically connected with the non-transitory computer readable medium for enabling processor 6 to execute and run adaptive filtering protocol 10 for performing adaptive filtering operations. As discussed in greater detail below, adaptive filtering protocol 10 enables processor 6 to digitally sample digitized input signal 3' by using applications of interpolation and deterministic gradient descent optimization to generate a match filter that substantially matches to digitized input signal 3'. Such functions and logic of adaptive filtering protocol 10 are now discussed in greater detail below.

Figure 2A:
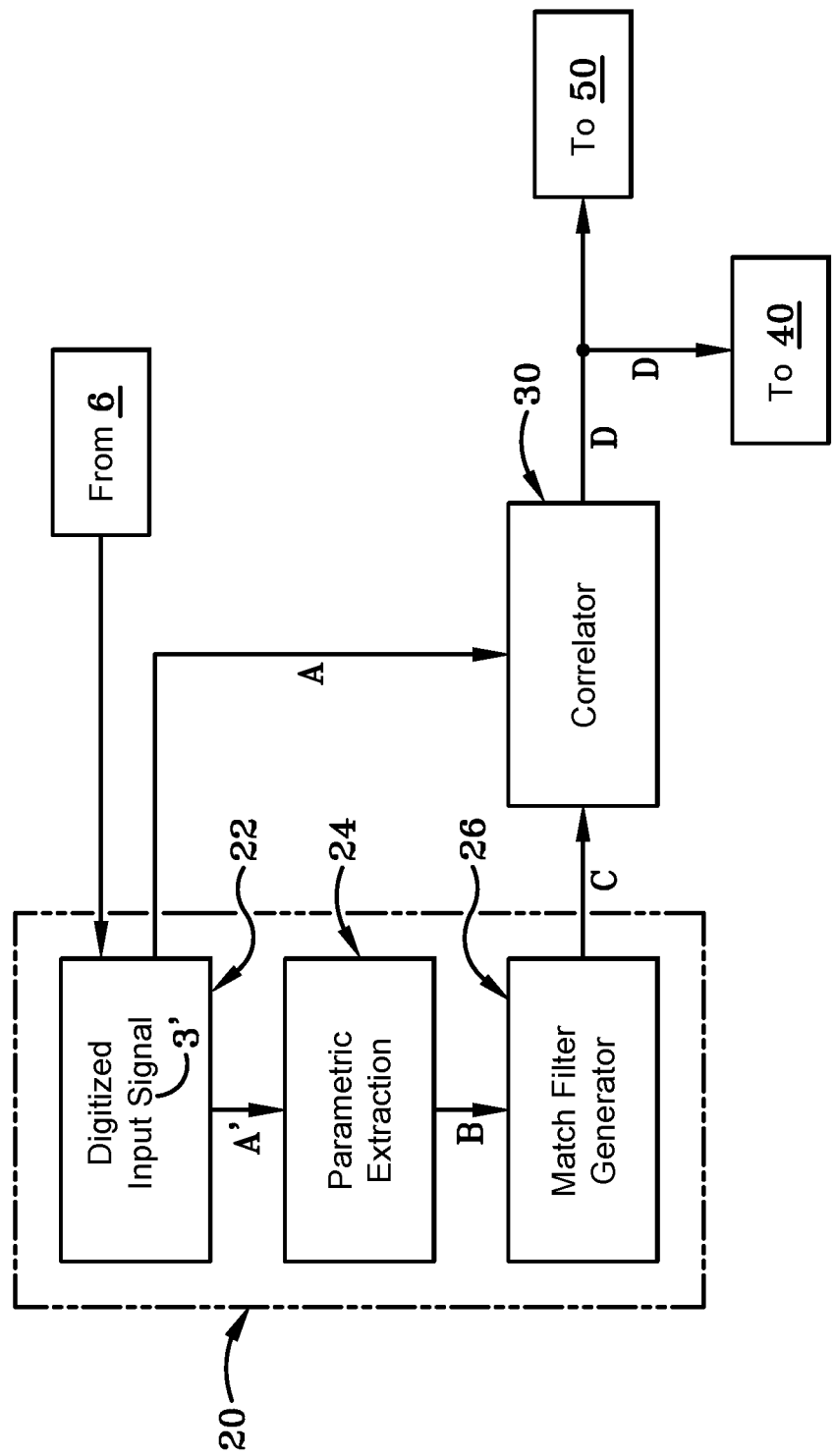
FIG. 2A (FIG. 2A) is a diagrammatic flowchart of a first processing loop of the adaptive filter protocol.

Referring to FIG. 2A, adaptive filtering protocol 10 includes a first processing loop or objective loop generally referred to as reference numeral 20. First processing loop 20 includes as shown by the input signal logic block 22, parametric extraction logic 24, and match filter generator logic 26. In the present disclosure, first processing loop 20 is configured to synthesize an estimated signal that is substantially similar to digitized input signal 3' that was emitted by emitter system 4 and processed by the receiving device 2. If not performed by receiving device 2, first processing network 20 may be configured to apply estimated parameters and/or limitations to the digitized input signal 3' upon receiving digitized input signal 3' such that digitized input signal 3' is bound at two distinct sampling points or ends (e.g., a start sampling point and a stop sampling point) for processing purposes. First processing network 20 is also configured to generate an estimated match filter for the estimated input signal that should substantially mirror the parameters of digitized input signal 3'. Such functions and logic of first processing loop 20 are discussed in greater detail below.

First processing loop 20 includes an input signal function or logic 22. In the present disclosure, input signal logic 22 is in logical communication with the processor 6 such that input signal logic 22 receives digitized input signal 3'. Input signal logic 22 is configured to introduce and/or load the digitized input signal 3' into first processing loop 20 for synthesizing an estimated signal or waveform that substantially matches with the waveform of digitized input signal 3'. At this stage in first processing loop 20, input signal logic 22 is in logical communication with a correlator or a correlation logic 30 and the digitized input signal 3' is provided to the correlator 30 shown by the path labeled "A."

First processing loop 20 includes a parametric extraction function or logic 24. As best seen in FIG. 2A, parametric extraction logic 24 is in logical communication with input signal logic 22 also receiving the digitized input signal 3' along the path "A'." With such logical communication with input signal logic 22, parametric extraction logic 24 is enabled to receive the initial parameters "A" of digitized input signal 3'. In the present disclosure, the term "initial parameters" is defined as being sampling data or sampling points of the input signal 3 initially detected by receiving device 2 and then digitally converted to digitized input signal 3', signal components of the input signal 3 initially detected by receiving device 2 and then digitally converted to digitized input signal 3', and other signal components forming the input signal 3.

In the present disclosure, parametric extraction logic 24 is configured to perform a Fast Fourier Transform operation on the initial parameters "A" of digitized input signal 3' to determine anomalies and/or irregularities that are provided in a frequency band of digitized input signal 3'. Upon such operation, parametric extraction logic 24 may then be configured to extract waveform parameters and/or characteristics from initial parameters "A" of digitized input signal 3' if the estimated waveform generated by first processing loop 20 occupies or is within a range of bandwidth of an estimated waveform generated by first processing loop 20. Stated differently, parametric extraction logic 24 may be preloaded or designed with signal characteristics that may be found in the initial parameters "A" of digitized input signal 3' and the initial parameters "A" are unknown to adaptive filter protocol 10. If such parameters and/or characteristics are found in the frequency band of digitized input signal 3', parametric extraction logic 24 is configured to output extracted parameters (denoted by an arrow labeled "B" in FIG. 2). It should be understood that the parameters extracted by the parametric extraction logic 24 may be time of signal arrival, signal duration, center frequency, bandwidth, signal modulation, pulse repetition frequency, and other desirable parameters for estimating a waveform of the digitized input signal 3'. It should also be understood that parametric extraction logic 24 may also be configured to perform a Pulse Descriptor Words (PDW) operation that includes spectral and temporal components.

First processing loop 20 also includes a match filter logic or match filter generator 26. As best seen in FIG. 2A, match filter generator 26 is in logical communication with parametric extraction logic 24. With such logical communication with parametric extraction logic 24, match filter generator 26 is enabled to receive the extracted parameters "B" uncovered by parametric extraction logic 24 when analyzed by parametric extraction logic 24.

In the present disclosure, processor 6 executes match filter generator 26 to build and/or generate a match filter to match or predict the estimated waveform based on the extracted parameters "B" extracted by the parametric extraction logic 24. Once the estimated waveform is built by processor 6 upon execution of match filter generator 26, match filter generator 26 is configured to output match filter parameters (denoted by an arrow labeled "C" in FIG. 2A) to a correlator or a correlation logic 30 of the first processing loop 20.

First processing loop 20 includes the correlator or correlation logic 30 that received the digitized input signal 3' represented by the path labeled A and the estimated waveform synthesized by the processing loop 20 and shown as the path labeled C. The correlator 30 is in logical communication with match filter generator 26 to receive the match filter parameters "C." The correlator 30 also receives the initial parameters "A" of digitized input signal 3'.

In the present disclosure, correlator 30 is configured to compare the initial parameters "A" and the match filter parameters "C" generated by the match filter generator 26. Correlator 30 also includes a correlation threshold and/or correlation setting that enables correlator 30 to either output the match filter parameters "C" to an output device 50 on platform 1 if the correlation meets the correlations threshold or to output the match filter parameters "C" to a second or gradient descent processing loop 40 of adaptive filter protocol 10 for further refinement and/or convergence. In the present disclosure, correlator 30 outputs correlation parameters (denoted by an arrow labeled "D" in FIG. 2A). Here, correlation parameters "D" include a first correlation value that fails to meet the correlation threshold necessary for outputting the correlation parameters "D" to output device 50.

Adaptive filter protocol 10 also includes a second or gradient descent processing loop 40 that is operatively in communication with the first processing loop 20. As best seen in FIG. 2, the first processing loop 20 and the second processing loop 40 are in logical communication with one another such that the first processing loop 20 may send electrical communication to the second processing loop 40. With such logical communication with first processing loop 20, second processing loop 40 is configured to receive the initial parameters "A" of input signal 3, the extracted parameters "B" of parametric extraction logic 24, the match filter parameters "C" generated by match filter generator 26, and the correlation parameters "D" generated by correlator 30. In the present disclosure, second processing loop 40 is configured to refine the estimated waveform initially synthesized by the first processing loop 20 by performing one or more deterministic gradient descent optimization techniques and interpolation techniques on the initial parameters "A" of digitized input signal 3', the match filter parameters "C" generated by match filter generator 26, and the correlation parameters "D" generated by correlator 30. Such functions and logic of second processing loop 40 are discussed in greater detail below.

Figure 2B:
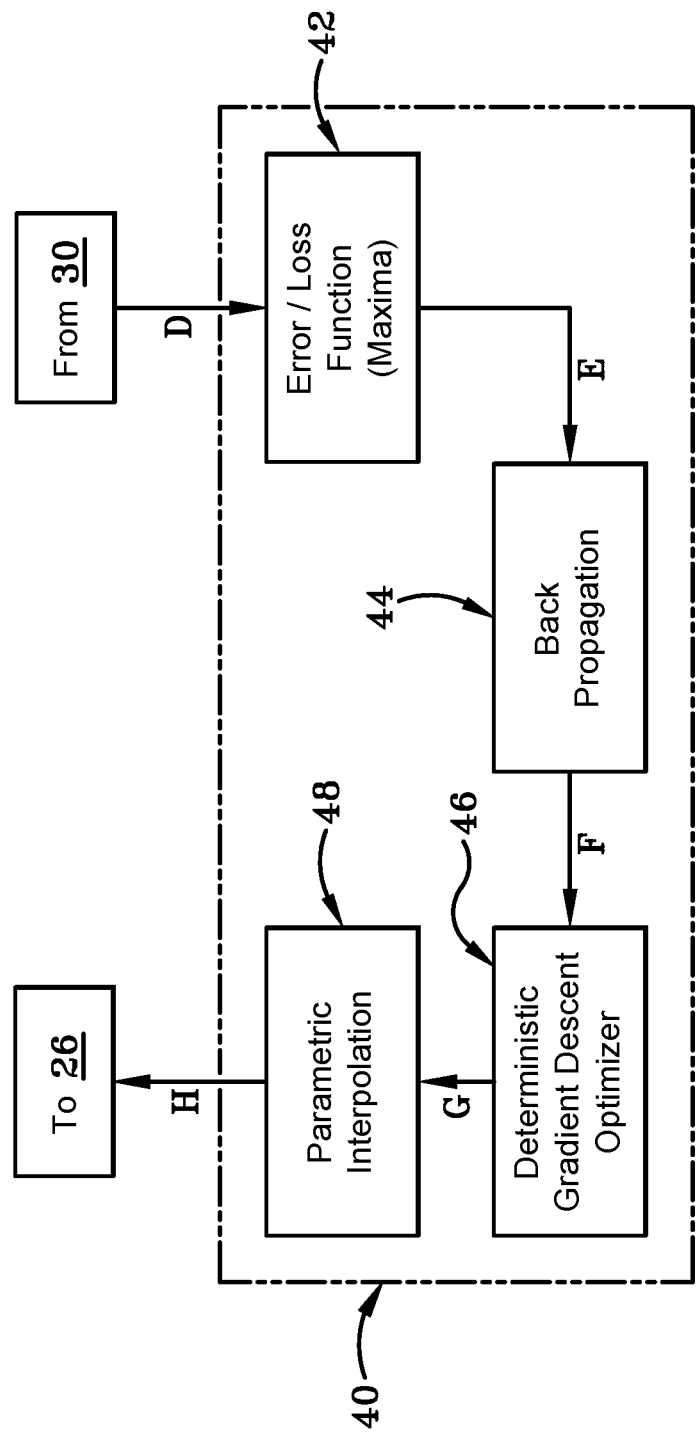
FIG. 2B (FIG. 2B) is a diagrammatic flowchart of a second processing loop of the adaptive filter protocol.

Second processing loop 40 may include an error/loss logic 42. As best seen in FIG. 2B, error/loss logic 42 is operatively in communication with the correlator 30 such that the correlator 30 and the error/loss logic 42 are in logical communication with one another. With such logical communication with the correlator 30, the error/loss logic 42 in configured to receive the initial parameters A of digitized input signal 3', the match filter parameters "C" generated by match filter generator 26, and the correlation parameters "D" generated by correlator 30.

In operation, error/loss logic 42 is configured to output a set of error/loss parameters (denoted by an arrow labeled "E" in FIG. 2B) based on the initial parameters A, the match filter parameters "C", and the correlation parameters "D". The error/loss parameters "E" calculated by the error/loss logic 42 includes parameters that are in error and/or omitted based on the parameters outputted from the first processing loop 20. In this particular application, the error/loss logic 42 is configured to maximize the error/loss parameters "E." Stated differently, the error/loss parameters "E" outputted by the error/loss logic 42 provide a measurement in comparing the predicated signal parameters (i.e., the match filter parameters "C" and the correlation parameters "D") with the actual signal parameters (i.e., initial parameters "A" of input signal 3). Additionally, the error/loss logic 42 may also be configured to minimize the error/loss parameters "E" through maximization of the correlation data accomplished in the previous correlation operations by correlator 30.

Second processing loop 40 may include a backpropagation function or logic 44. As best seen in FIG. 2B, backpropagation logic 44 is operatively in communication with the error/loss logic 42 such that the error/loss logic 42 and the backpropagation logic 44 are in logical communication with one another. With such logical communication with the error/loss logic 42, the backpropagation logic 44 is configured to receive the initial parameters "A" of digitized input signal 3', the match filter parameters "C" generated by match filter generator 26, the correlation parameters "D" generated by correlator 30, and the error/loss parameters "E" generated by error/loss logic 42.

In operation, backpropagation logic 44 is configured to calculate a gradient based on the error/loss parameters "E" generated by the error/loss logic 42 with respect to the initial parameters "A", the match filter parameters "C", the correlation parameters "D". Such gradient or feedback parameters calculated by the backpropagation logic 44 is denoted by an arrow labeled "F" in FIGS. 2B-4. With feedback parameters "F" outputted by the backpropagation logic 44, each error/loss parameter "E" measured by the error/loss logic 42 includes a weight or loss value that may be updated individually to gradually reduce the error/loss parameters "E" measured by the error/loss logic 42 over each optimization iteration and/or cycle of the second processing loop 40.

Second processing loop 40 may include a deterministic gradient descent optimizer 46. As best seen in FIG. 2B, deterministic gradient descent optimizer 46 is operatively in communication with backpropagation logic 44 such that the backpropagation logic 44 and the deterministic gradient descent optimizer 46 are in logical communication with one another. In the present disclosure, the deterministic gradient descent optimizer 46 is in series with the backpropagation logic 44 such that the backpropagation logic 44 outputs the feedback parameters "F" to the deterministic gradient descent optimizer 46. In operation, deterministic gradient descent optimizer 46 is configured to further refine the match filter parameters "C" at a desired convergence rate through use of gradient descent optimization techniques to find and/or uncover the localized maximum values in each optimization iteration by outputting a set of deterministic parameters (labeled "G" in FIGS. 2-4). Such functions and logic of deterministic gradient descent optimizer 46 are discussed in greater detail below.

Figure 3:
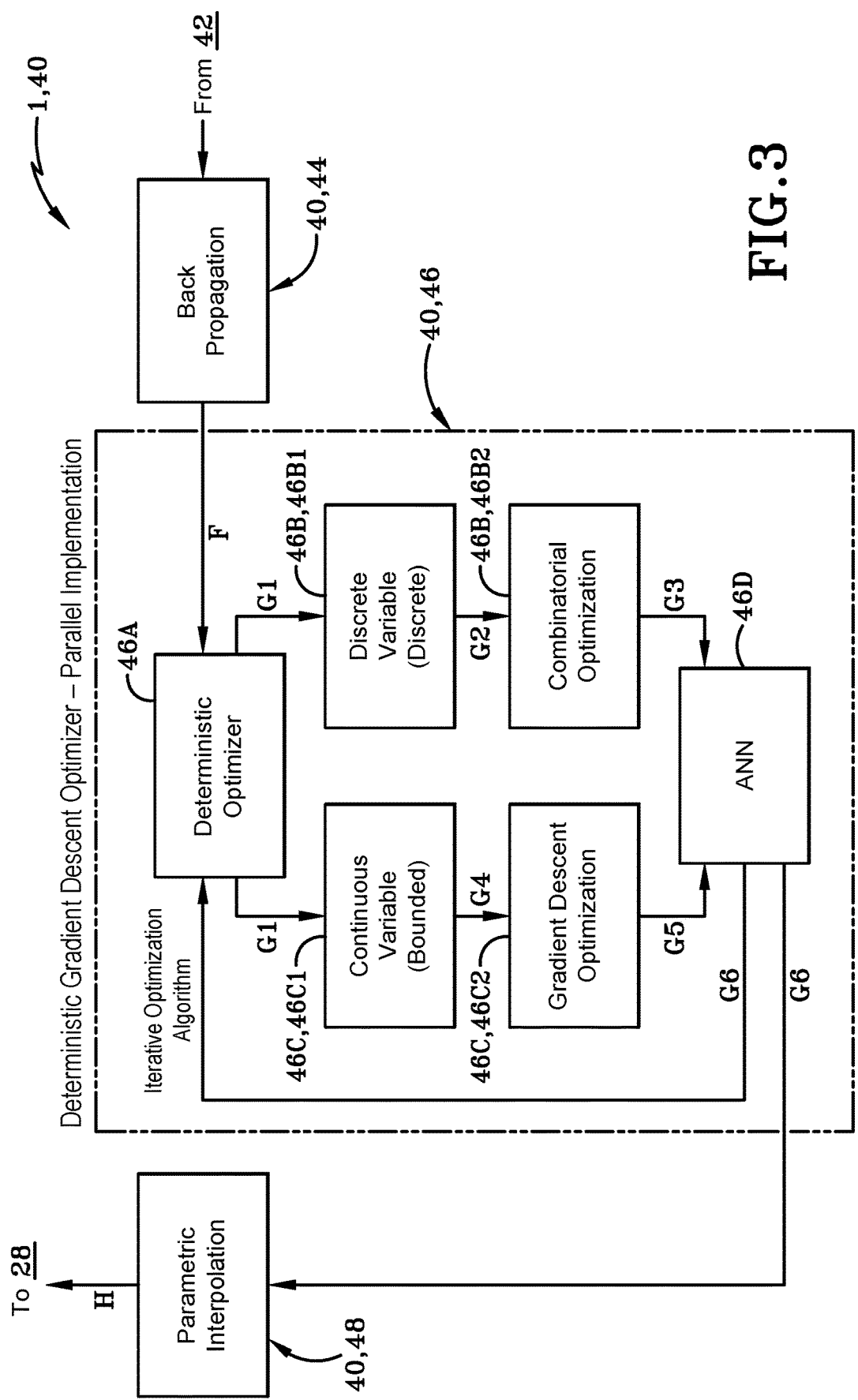
FIG. 3 (FIG. 3) is a diagrammatic flowchart of a first implementation of a deterministic gradient descent optimizer of the adaptive filter protocol.

Deterministic gradient descent optimizer 46 includes a deterministic optimizer 46A. As best seen in FIG. 3, deterministic optimizer 46A is operatively in communication with backpropagation logic 44 such that the backpropagation logic 44 and the deterministic optimizer 46A are in logical communication with one another. In the present disclosure, the deterministic optimizer 46A is in series with the backpropagation logic 44. With such logical communication, deterministic optimizer 46A is configured to receive the feedback parameters "F" from backpropagation logic 44 calculated from initial parameters "A" of digitized input signal 3', the match filter parameters "C" generated by match filter generator 26, the correlation parameters "D" generated by correlator 30, and the error/loss parameters "E" generated by error/loss logic 42.

In operation, deterministic optimizer 46A is configured to optimize and/or refine the feedback parameters "F" from backpropagation logic 44 to find the local maxima in the feedback parameters "F". More particularly, the deterministic optimizer 46A is configured to optimize and/or refine the feedback parameters F from backpropagation logic 44 to find the local maxima in both the continuous or bounded variables of the feedback parameters "F" and/or the discrete variables of the feedback parameters "F" by outputting deterministic parameters (denoted by arrows labeled "G1" in FIGS. 3 and 4) to a discrete variable pathway of deterministic gradient descent optimizer 46 and a continuous variable pathway of deterministic gradient descent optimizer 46, which is discussed in greater detail below.

Figure 4:
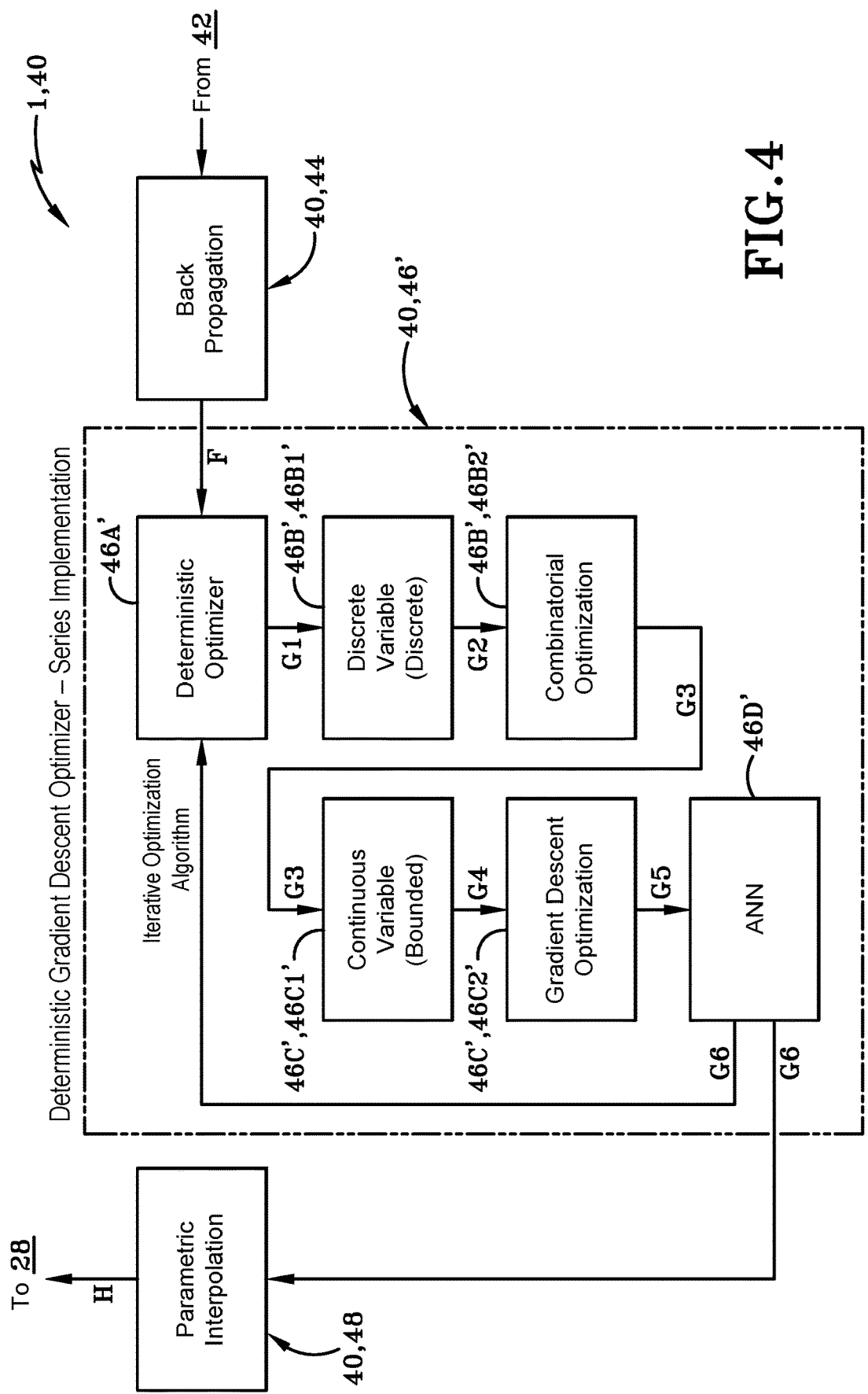
FIG. 4 (FIG. 4) is a diagrammatic flowchart of a second implementation of the deterministic gradient descent optimizer of the adaptive filter protocol, wherein the first implementation and the second implementation are different from one another.

In operation, deterministic optimizer 46A is also configured to compare new or the most recent feedback parameters "F" propagated by the backpropagation logic 44 with previous or historical local maxima found in the previous feedback parameters "F" from previous optimization iterations to determine new or refined local maxima in each optimization iteration and/or cycle (see arrow labeled "Iterative Optimization Algorithm" in FIGS. 3-4). It should be noted that deterministic optimizer 46A is configured to continuously optimize and refine one or more sets of feedback parameters "F" from backpropagation logic 44 (both discrete parameters and continuous parameters) as long as the processor 6 continuously executes the second processing loop 40 until a refined set of match filter parameters (denoted by an arrow labeled "C" in FIGS. 3-4) is reached and is converged with the match filter parameters "C" to meet the correlation threshold of correlator 30. With such a configuration, the deterministic optimizer 46A is configured to continuously optimize and/or refine sets of feedback parameters "F" outputted by backpropagation logic 44 to find local maxima in both the continuous or bounded variables of the feedback parameters "F" and/or the discrete variables of the feedback parameters "F" by outputting sets of deterministic parameters "G1" to a discrete variable pathway of deterministic gradient descent optimizer 46 and a continuous variable pathway of deterministic gradient descent optimizer 46.

Deterministic gradient descent optimizer 46 may also include a first or discrete variable pathway 46B. As best seen in FIG. 3, discrete variable pathway 46B is operatively in communication with deterministic optimizer 46A such that the deterministic optimizer 46A and the discrete variable pathway 46B are in logical communication with one another. In the present disclosure, the discrete variable pathway 46B is in series with the deterministic optimizer 46A. With such logical communication with the deterministic optimizer 46A, discrete variable pathway 46B is enabled to receive the deterministic parameter "G1" from deterministic optimizer 46A to analyze and assess any and all discrete characteristics provided in the deterministic parameter "G1", such as frequency characteristics, pulse rates, and other discrete characteristics, for finding a localized maxima. Such functions and logic of discrete variable pathway 46B are discussed in greater detail below.

With respect to the discrete variable pathway 46B, discrete variable pathway 46B includes a discrete variable logic 46B1. As best seen in FIGS. 3-4, discrete variable logic 46B1 is operatively in communication with deterministic optimizer 46A such that the deterministic optimizer 46A and the discrete variable logic 46B1 are in logical communication with one another. In the present disclosure, the discrete variable logic 46B1 is in series with the deterministic optimizer 46A. With such logical communication with the deterministic optimizer 46A, discrete variable logic 46B1 is enabled to receive the deterministic parameter "G1" from deterministic optimizer 46A.

In operation, discrete variable logic 46B1 is configured to extract any and all discrete characteristics provided in the deterministic parameter "G1", such as frequency characteristics, pulse rates, and other discrete characteristics; such discrete parameters assessed and extracted by discrete variable logic 46B1 are denoted by an arrow labeled "G2" in FIGS. 3-4.

Still referring to discrete variable pathway 46B, discrete variable pathway 46B also includes a combinatorial optimization logic 46B2. As best seen in FIG. 3, combinatorial optimization logic 46B2 is operatively in communication with discrete variable logic 46B1 such that the discrete variable logic 46B1 and the combinatorial optimization logic 46B2 are in logical communication with one another. In the present disclosure, the combinatorial optimization logic 46B2 is in series with the discrete variable logic 46B1. With such logical communication with the discrete variable pathway 46B1, combinatorial optimization logic 46B2 is enabled to receive the discrete parameters "G2" from discrete variable logic 46B1.

In operation, combinatorial optimization logic 46B2 is configured to find localized maxima provided in the discrete parameters "G2" outputted by discrete variable logic 46B1. Stated differently, combinatorial optimization logic 46B2 is configured to find the optimal discrete object provided in the discrete parameters "G2" outputted by discrete variable logic 46B1. Upon such determination, combinatorial optimization logic 46B2 outputs one or more optimal discrete parameters (denoted by an arrow labeled "G3" in FIGS. 3-4) to enable refinement and optimization of the estimated match filter generated by adaptive filter protocol 10.

Deterministic gradient descent optimizer 46 may also include a second or continuous variable pathway 46C. As best seen in FIG. 3, continuous variable pathway 46C is operatively in communication with deterministic optimizer 46A such that the deterministic optimizer 46A and the continuous variable pathway 46C are in logical communication with one another. In the present disclosure, the continuous variable pathway 46C is in series with the deterministic optimizer 46A. With such logical communication with the deterministic optimizer 46A, continuous variable pathway 46C is enabled to receive the deterministic parameter "G1" from deterministic optimizer 46A to analyze and assess any and all continuous characteristics provided in the deterministic parameter "G1", such as a start frequency of the input signal 3, a stop frequency of the input signal 3, and the transition in time, rate, or change between start frequency and the stop frequency, for finding a localized maxima. Such functions of continuous variable pathway 46C are discussed in greater detail below.

With respect to the continuous variable pathway 46C, continuous variable pathway 46C includes a continuous variable logic 46C1. As best seen in FIG. 3, continuous variable logic 46C1 is operatively in communication with deterministic optimizer 46A such that the deterministic optimizer 46A and the continuous variable logic 46C1 are in logical communication with one another. In the present disclosure, the continuous variable logic 46C1 is in series with the deterministic optimizer 46A. With such logical communication with deterministic optimizer 46A, continuous variable logic 46C1 is enabled to receive the deterministic parameter "G1" from deterministic optimizer 46A.

In operation, continuous variable logic 46C1 is configured to extract any and all continuous characteristics provided in the deterministic parameter "G1", such as a start frequency of the input signal 3, a stop frequency of the input signal 3, and the transition in time, rate, or change between start frequency and the stop frequency; such continuous parameters assessed and extracted by continuous variable logic 46C1 are denoted by an arrow labeled "G4" in FIGS. 3-4.

Still referring to continuous variable pathway 46C, continuous variable pathway 46C also includes a gradient descent optimization logic 46C2. As best seen in FIG. 3, gradient descent optimization logic 46C2 is operatively in communication with continuous variable logic 46C1 such that the continuous variable logic 46C1 and the gradient descent optimization logic 46C2 are in logical communication with one another. In the present disclosure, the gradient descent optimization logic 46C2 is in series with the continuous variable logic 46C1. With such logical communication with continuous variable logic 46C1, gradient descent optimization logic 46C2 is enabled to receive the continuous parameters "G4" from continuous variable logic 46C1.

In operation, gradient descent optimization logic 46C2 is configured to find localized maxima provided in the continuous parameters "G3" outputted by continuous variable logic 46C1. Stated differently, gradient descent optimization logic 46C2 is configured to find the optimal continuous object provided in the continuous parameters "G4" outputted by continuous variable logic 46C1. Upon such determination, gradient descent optimization logic 46C2 outputs one or more optimal continuous parameters (denoted by an arrow labeled "G5" in FIGS. 3-4) to enable refinement and optimization of the estimated match filter generated by adaptive filter protocol 10.

Deterministic gradient descent optimizer 46 also includes an artificial neural network (ANN) or neural network 46D. As best seen in FIG. 3, neural network 46D is operatively in communication with discrete variable pathway 46B and continuous variable pathway 46C such that the discrete variable pathway 46B and continuous variable pathway 46C and the neural network 46D are in logical communication with one another. More particularly, neural network 46D is in logical communication with the combinatorial optimization logic 46B2 and the gradient descent optimization logic 46C2. With such logical communication with the combinatorial optimization logic 46B2 and the gradient descent optimization logic 46C2, neural network 46D is configured to receive the optimal discrete parameter "G3" from the combinatorial optimization logic 46B2 and the optimal continuous parameter "G5" from the gradient descent optimization logic 46C2.

In operation, neural network 46D is configured to utilize the optimal discrete parameter "G3" and the optimal continuous parameter "G5" to generate and/or synthesize a refined match filter that matches with the initial parameters "A" of the input signal 3. It should be understood that neural network 46D may be designed and/or configured with known computation features used in neural network for optimizing an optimal match filter based on the optimal discrete parameter "G3" and the optimal continuous parameter "G5". Upon generating a refined match filter, neural network 46D outputs the refined match filter parameters (denoted by arrows labeled "G6" in FIGS. 3-4) to at least another function or logic component of the second processing loop 40 for interpolation, which is discussed in greater detail below.

Upon generating the refined match filter, neural network 46D also outputs the refined match filter parameters back to the deterministic optimizer 46A, via the iterative optimization algorithm loop, for seeding and/or creating a historical log of refined match filters for second processing loop 40. Such seeding of the second processing loop 40 enables the deterministic optimizer 46A to predict localized maxima found in the feedback parameters "F" as the amount of optimization iterations or cycles increases over time. It should be understood that a suitable number of optimization iterations must be accomplished in order to seed the deterministic optimizer 46A. In one example, at least three optimization iterations (i.e., three cycles of optimization through the second processing loop 40) must be accomplished in order to seed the deterministic optimizer 46A for predicting localized maxima found in the feedback parameters "F".

In operation, neural network 46D is also configured to continuously optimize and refine a match filter as the discrete variable pathway 46B and continuous variable pathway 46C continuous extract and find optimal discrete parameters "G3" and/or optimal continuous parameters "G5" in a plurality of optimization iterations. Such optimization and refinement of a match filter enables the neural network 46D to seed the deterministic optimizer 46A for generating a refined match filter that is complementary with the initial parameters "A" of digitized input signal 3'.

In the present disclosure, the discrete variable pathway 46B and the continuous variable pathway 46C may be provided in any suitable logical arrangement and/or implementation for deterministic gradient descent optimizer 46. As best seen in FIG. 3, discrete variable pathway 46B and continuous variable pathway 46C are provided in a parallel implementation such that each of the discrete variable pathway 46B and continuous variable pathway 46C is in logical communication with the deterministic optimizer 46A and the neural network 46D. As such, processor 6 may be enabled to execute both the discrete variable pathway 46B and continuous variable pathway 46C simultaneously. This particular implementation of the discrete variable pathway 46B and continuous variable pathway 46C is desired when higher levels of dependencies (both time and frequency components like input signals 3 or a communication signal) are present.

In an alternative embodiment, an alternative deterministic gradient descent optimizer 46' may include a series implementation. As best seen in FIG. 4, deterministic gradient descent optimizer 46' may include an alternative discrete variable pathway 46B' and an alternative continuous variable pathway 46C' that are provided in a series implementation such that discrete variable pathway 46B' and continuous variable pathway 46C' are in series with one another. As such, processor 6 is enabled to execute the discrete variable pathway 46B' and then execute the continuous variable pathway 46C' subsequent to the discrete variable pathway 46B'. This particular implementation of the discrete variable pathway 46B' and continuous variable pathway 46C' is desired when adaptive filter protocol 10 may enable a processor 6 to optimize across a set of discrete variables (e.g., frequency components, fixed pulse characteristics, etc.).

It should be understood that the functions and/or logic of alternative deterministic gradient descent optimizer 46' operate substantially similar to the deterministic gradient descent optimizer 46. As such, a deterministic optimizer 46A', discrete variable pathway 46B' having a discrete variable logic 46B1' and a combinatorial optimization logic 46B2', continuous variable pathway 46C' having a continuous variable logic 46C1' and a gradient descent optimization logic 46C2', and a neural network 46D' are substantially similar to the deterministic optimizer 46A, discrete variable pathway 46B having the discrete variable logic 46B1 and the combinatorial optimization logic 46B2, continuous variable pathway 46C having the continuous variable logic 46C1 and the gradient descent optimization logic 46C2, and the neural network 46D of the deterministic gradient descent optimizer 46.

Deterministic gradient descent optimizer 46 includes a parametric interpolation function or logic 48. As best seen in FIGS. 2B-4, parametric interpolation logic 48 is operatively in communication with deterministic gradient descent optimizer 46 such that the deterministic gradient descent optimizer 46 and the parametric interpolation logic 48 are in logical communication with one another. More particularly, parametric interpolation logic 48 is operatively in communication with neural network 46D such that the neural network 46D and the parametric interpolation logic 48 are in logical communication with one another. In the present disclosure, the parametric interpolation logic 48 is in series with the neural network 46D. With such logical communication with the neural network 46D, parametric interpolation logic 48 is configured to receive the refined match filter parameters "G6" from the neural network 46D.

Still referring to FIGS. 2B-4, parametric interpolation logic 48 is also operatively in communication with first processing loop 20 such that the first processing loop 20 and the parametric interpolation logic 48 are in logical communication with one another. More particularly, parametric interpolation logic 48 is operatively in communication with match filter generator 26 such that the match filter generator 26 and the parametric interpolation logic 48 are in logical communication with one another. With such logical communication with the neural network 46D, parametric interpolation logic 48 is configured to output parameters to the match filter generator 26 for a second correlation between the initial parameters "A" of digitized input signal 3' and the refined match filter parameters "G6" synthesized by the second processing loop 40.

In operation, parametric interpolation logic 48 is configured to combine and/or converge the refined match filter parameters "G6" with the match filter parameters "C" initially generated by the match filter generator 26. Stated differently, the match filter parameters "C" initially generated by the match filter generator 26 will be modified and/or refined by the parametric interpolation logic 48 based on the refined match filter parameters "G6" to provide a greater or second correlation value with the initial parameters "A" of the digitized input signal 3' as compared to the first or previous correlation values between the initial parameters "A" and the match filter parameters "C".

It should be understood that such refinement of the match filter parameters "C" may be continuous depending on the number of optimization iterations and/or cycles performed by the second processing loop 40. The processor 6 may continuously execute the second processing loop 40 until the refined match filter or synthesized parameters "G6" substantially correlates and/or matches with the initial parameters "A" of the digitized input signal 3' meeting the correlation threshold designed in the correlator 30.

Figure 5:
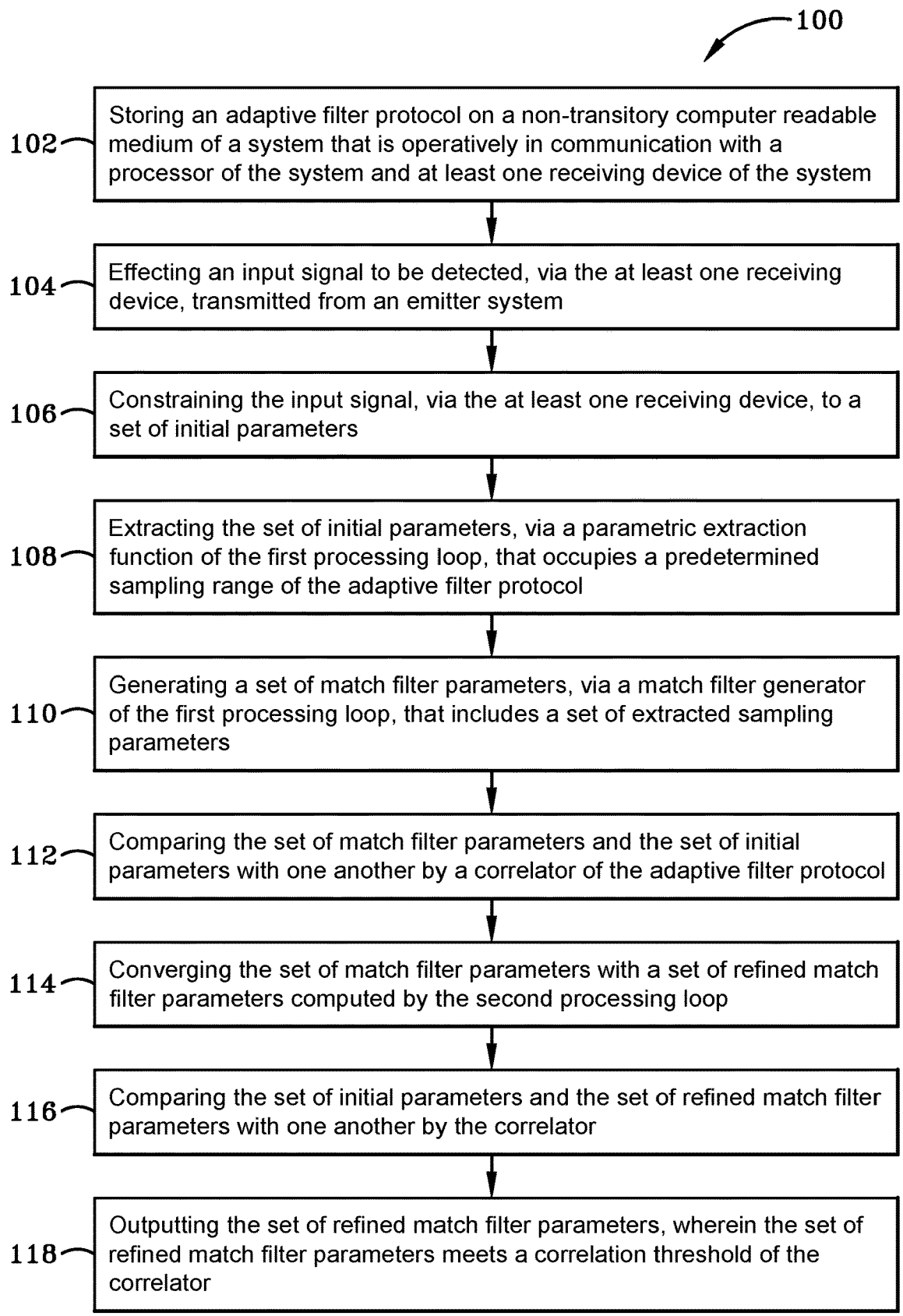
FIG. 5 (FIG. 5) is an exemplary method flowchart.

FIG. 5 illustrate a method 100. An initial step 102 of method 100 includes storing an adaptive filter protocol on a non-transitory computer readable medium of a system that is operatively in communication with a processor of the system and at least one receiving device of the system, the adaptive filter protocol comprises: a first processing loop operatively in communication with the at least one receiving device of the system; and a second processing loop operatively in communication with the first processing loop and having a deterministic gradient descent optimization function and an interpolation function. Another step 104 of method 100 includes effecting an input signal to be detected, via the at least one receiving device, transmitted from an emitter system. Another step 106 of method 100 includes constraining the input signal, via the at least one receiving device, to a set of initial parameters. Another step 108 of method 100 includes extracting the set of initial parameters, via a parametric extraction function of the first processing loop, that occupies a predetermined sampling range of the adaptive filter protocol. Another step 110 of method 100 includes generating a set of match filter parameters, via a match filter generator of the first processing loop, that includes a set of extracted sampling parameters. Another step 112 of method 100 includes comparing the set of match filter parameters and the set of initial parameters with one another by a correlator of the adaptive filter protocol. Another step 114 of method 100 includes converging the set of match filter parameters with a set of refined match filter parameters computed by the second processing loop. Another step 116 of method 100 includes comparing the set of initial parameters and the set of refined match filter parameters with one another by the correlator. Another step 118 of method 100 includes outputting the set of refined match filter parameters, wherein the set of refined match filter parameters meets a correlation threshold of the correlator.

Optional and/or additional steps may be further taken in method 100. This exemplary embodiment or another exemplary embodiment further includes that the step of converging the set of match filter parameters with a set of refined match filter parameters further comprises: outputting the set of match filter parameters from the correlator to an error/loss function of the second processing loop; computing a set of error/loss parameters, by the error/loss function, based on a lack of correlation between the set of initial parameters and the set of match filter parameters. This exemplary embodiment or another exemplary embodiment further includes that the step of converging the set of match filter parameters with a set of refined match filter parameters further comprises: outputting the set of error/loss parameters from the error/loss function to a backpropagation function of the second processing loop; and computing a set of feedback parameters, by the backpropagation function, with respect to the set of initial parameters, the set of match filter parameters, and the set of error/loss parameters. This exemplary embodiment or another exemplary embodiment further includes that the step of converging the set of match filter parameters with a set of refined match filter parameters further comprises: outputting the set of feedback parameters from the backpropagation function to a deterministic optimizer of the second processing loop; assessing the set of initial parameters, the set of extracted parameters, and the set of error/loss parameters by the deterministic optimizer; and generating a set of deterministic parameters that includes discrete variables and continuous variables based on the set of initial parameters, the set of extracted parameters, and the set of error/loss parameters. This exemplary embodiment or another exemplary embodiment further includes extracting a set of discrete parameters by a discrete variable function of a discrete variable pathway of the second processing loop; and computing at least one optimal discrete parameter, by a combinatorial optimization function of the discrete variable pathway, from the set of discrete parameters. This exemplary embodiment or another exemplary embodiment further includes extracting a set of continuous parameters by a continuous variable function of a continuous variable pathway of the second processing loop; and computing at least one optimal continuous parameter, by a gradient descent optimization function of the continuous variable pathway, from the set of continuous parameters. This exemplary embodiment or another exemplary embodiment further includes extracting a set of discrete parameters by a discrete variable function of a discrete variable pathway of the second processing loop; computing at least one optimal discrete parameter, by a combinatorial optimization function of the discrete variable pathway, from the set of discrete parameters; extracting a set of continuous parameters by a continuous variable function of a continuous variable pathway of the second processing loop; and computing at least one optimal continuous parameter, by a gradient descent optimization function of the continuous variable pathway, from the set of continuous parameters. This exemplary embodiment or another exemplary embodiment further includes that the steps of extracting the set of continuous parameters by the continuous variable function and computing the at least one optimal continuous parameter by the gradient descent optimization function are performed simultaneously with the steps of extracting the set of discrete parameters by the discrete variable function and computing the at least one optimal discrete parameter by the combinatorial optimization function or performed subsequent to the steps of extracting the set of discrete parameters by the discrete variable function and computing the at least one optimal discrete parameter by the combinatorial optimization function. This exemplary embodiment or another exemplary embodiment further includes computing the refined match filter parameters, by a neural network of the second processing loop, based on the at least one optimal continuous parameter and the at least one discrete parameter; and seeding the refined match filter parameters, via an iterative optimization function, by outputting the refined match filter parameters to the deterministic optimizer in each refining cycle of the plurality of refining cycles. This exemplary embodiment or another exemplary embodiment further includes that the step of converging the set of match filter parameters with the set of refined match filter parameters further includes that a parametric interpolation function is configured to converge the refined match filter parameters with the match filter parameters generated by the match filter generator.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system, comprising:
   at least one receiving device adapted to receive at least one input signal having initial parameters emitted from an emitter system;

a processor operatively in communication with the at least one receiving device; and an adaptive filter protocol stored on a non-transitory computer readable medium that is operatively in communication with the processor, the adaptive filter protocol comprises:

a first processing loop operatively in communication with the at least one receiving device for receiving the initial parameters of the at least one input signal; and a second processing loop operatively in communication with the first processing loop and having a deterministic gradient descent optimization logic and an interpolation logic that, when executed by the processor, generates synthesized initial parameters of a synthesized input signal that substantially correlates with the initial parameters of the at least one input signal upon completing a plurality of refining cycles of the second processing loop.

2. The system of claim 1, wherein the adaptive filter protocol further comprises:

a correlation logic operatively in communication with the first processing loop and the second processing loop;

wherein the correlation logic is configured with a correlation threshold for determining the refined match filter parameters substantially correlates with the initial parameters of the at least one signal.

3. The system of claim 2, further comprising:

a set of match filter parameters extracted from the initial parameters of the at least one input signal by the first processing loop;

wherein the set of match filter parameters is refined by the set of refined match filter parameters to meet the correlation threshold.

4. The system of claim 2, wherein the first processing loop comprises:

a parametric extraction logic operatively in communication with the processor and the at least one receiving device, wherein the parametric extraction logic is configured to output a set of extracted parameters extracted from the initial parameters defined within a predetermined range of parameters of the adaptive filter protocol; and a match filter generator operatively in communication with the parametric extraction logic, wherein the match filter generator is configured to generate a match filter based on the set of extracted parameters.

5. The system of claim 4, wherein the second processing loop comprises:

an error/loss logic operatively in communication with the correlation logic, wherein the error/loss logic is configured to output a set of error/loss parameters based on a lack of correlation between the set of initial parameters and the set of match filter parameters; and a backpropagation logic operatively in communication with the error/loss logic, wherein the backpropagation logic is configured to compute a set of feedback parameters based on the set of error/loss parameters and the set of match filter parameters.

6. The system of claim 5, wherein the deterministic gradient descent optimization logic comprises:

a deterministic optimizer operatively in communication with the backpropagation logic, wherein the deterministic optimizer is configured to assess and output the set of initial parameters, the set of match filter parameters, and the set of error/loss parameters;

a discrete variable pathway operatively in communication with the deterministic optimizer, wherein the discrete variable pathway is configured to find at least one optimal discrete variable from set of feedback parameters;

a continuous variable pathway operatively in communication with one of the deterministic optimizer and the discrete variable pathway, wherein the continuous variable pathway is configured find at least one optimal continuous variable from the set of feedback parameters; and a neural network operatively in communication with one or both of the continuous variable pathway and the discrete variable pathway, wherein the neural network is configured to compute the refined match filter parameters based on the at least one optimal continuous variable and the at least one discrete variable.

7. The system of claim 6, wherein the discrete variable pathway and the continuous variable pathway are implemented in a parallel implementation such that the continuous variable pathway and the discrete variable pathway are executed simultaneously.

8. The system of claim 6, wherein the discrete variable pathway and the continuous variable pathway are implemented in a series implementation such the continuous variable pathway is executed subsequent to the discrete variable pathway.

9. The system of claim 6, wherein the deterministic gradient descent optimization further comprises:

an iterative optimization logic operatively in communication with the neural network and the deterministic optimizer logic;

wherein the iterative optimization logic is configured to continuously send the refined match filter parameters in each refining cycle of the plurality of refining cycles from the neural network to the deterministic optimizer to seed the second processing loop.

10. The system of claim 6, wherein the second processing loop further comprises:

a parametric interpolation logic operatively in communication with neural network and the match filter generator;

wherein the parametric interpolation logic is configured to converge the refined match filter parameters with the match filter generated by the match filter generator.

11. A method, comprising:

storing an adaptive filter protocol on a non-transitory computer readable medium of a system that is operatively in communication with a processor of the system and at least one receiving device of the system, the adaptive filter protocol comprises:

a first processing loop operatively in communication with the at least one receiving device of the system; and a second processing loop operatively in communication with the first processing loop and having a deterministic gradient descent optimization function and an interpolation function;

effecting an input signal to be detected, via the at least one receiving device, transmitted from an emitter system;

constraining the input signal, via the at least one receiving device, to a set of initial parameters;

extracting the set of initial parameters, via a parametric extraction function of the first processing loop, that occupies a predetermined sampling range of the adaptive filter protocol;

generating a set of match filter parameters, via a match filter generator of the first processing loop, that includes a set of extracted sampling parameters;

comparing the set of match filter parameters and the set of initial parameters with one another by a correlator of the adaptive filter protocol;

converging the set of match filter parameters with a set of refined match filter parameters computed by the second processing loop;

comparing the set of initial parameters and the set of refined match filter parameters with one another by the correlator; and outputting the set of refined match filter parameters, wherein the set of refined match filter parameters meets a correlation threshold of the correlator.

12. The method of claim 11, wherein the step of converging the set of match filter parameters with a set of refined match filter parameters further comprises:

outputting the set of match filter parameters from the correlator to an error/loss function of the second processing loop; and computing a set of error/loss parameters, by the error/loss function, based on a lack of correlation between the set of initial parameters and the set of match filter parameters.

13. The method of claim 12, wherein the step of converging the set of match filter parameters with a set of refined match filter parameters further comprises:

outputting the set of error/loss parameters from the error/loss function to a backpropagation function of the second processing loop; and computing a set of feedback parameters, by the backpropagation function, with respect to the set of initial parameters, the set of match filter parameters, and the set of error/loss parameters.

14. The method of claim 13, wherein the step of converging the set of match filter parameters with a set of refined match filter parameters further comprises:

outputting the set of feedback parameters from the backpropagation function to a deterministic optimizer of the second processing loop;

assessing the set of initial parameters, the set of extracted parameters, and the set of error/loss parameters by the deterministic optimizer; and generating a set of deterministic parameters that includes discrete variables and continuous variables based on the set of initial parameters, the set of extracted parameters, and the set of error/loss parameters.

15. The method of claim 14, further comprising:

extracting a set of discrete parameters by a discrete variable function of a discrete variable pathway of the second processing loop; and computing at least one optimal discrete parameter, by a combinatorial optimization function of the discrete variable pathway, from the set of discrete parameters.

16. The method of claim 14, further comprising:

extracting a set of continuous parameters by a continuous variable function of a continuous variable pathway of the second processing loop; and computing at least one optimal continuous parameter, by a gradient descent optimization function of the continuous variable pathway, from the set of continuous parameters.

17. The method of claim 14, further comprising:

extracting a set of discrete parameters by a discrete variable function of a discrete variable pathway of the second processing loop;

computing at least one optimal discrete parameter, by a combinatorial optimization function of the discrete variable pathway, from the set of discrete parameters;

extracting a set of continuous parameters by a continuous variable function of a continuous variable pathway of the second processing loop; and computing at least one optimal continuous parameter, by a gradient descent optimization function of the continuous variable pathway, from the set of continuous parameters.

18. The method of claim 17, wherein the steps of extracting the set of continuous parameters by the continuous variable function and computing the at least one optimal continuous parameter by the gradient descent optimization function are performed simultaneously with the steps of extracting the set of discrete parameters by the discrete variable function and computing the at least one optimal discrete parameter by the combinatorial optimization function or performed subsequent to the steps of extracting the set of discrete parameters by the discrete variable function and computing the at least one optimal discrete parameter by the combinatorial optimization function.

19. The method of claim 17, further comprising:

computing the refined match filter parameters, by a neural network of the second processing loop, based on the at least one optimal continuous parameter and the at least one discrete parameter; and seeding the refined match filter parameters, via an iterative optimization function, by outputting the refined match filter parameters to the deterministic optimizer in each refining cycle of the plurality of refining cycles;

wherein the step of converging the set of match filter parameters with the set of refined match filter parameters further includes that a parametric interpolation function is configured to converge the refined match filter parameters with the match filter parameters generated by the match filter generator.

20. A computer program product including at least one non-transitory computer readable storage medium on a moving platform in operative communication with a processor and at least one receiving device engaged with the moving platform, the storage medium having instructions stored thereon, that, when executed by the processor, implement a process to determine synthesized initial parameters from an input signal emitted by an emitter system, the process comprising:

constraining the input signal, via the at least one receiving device, to a set of initial parameters;

extracting the set of initial parameters, via a parametric extraction function of a first processing loop, that occupies a predetermined sampling range of the adaptive filter protocol, wherein the first processing loop is in communication with the at least one receiving device;

generating a set of match filter parameters, via a match filter generator of the first processing loop, that includes a set of extracted sampling parameters;

comparing the set of match filter parameters and the set of initial parameters with one another by a correlator of the adaptive filter protocol;

converging the set of match filter parameters with a set of refined match filter parameters computed by a second processing loop, wherein the second processing loop is operatively in communication with the first processing loop and having a deterministic gradient descent optimization function and an interpolation function;

comparing the set of initial parameters and the set of refined match filter parameters with one another by the correlator; and outputting the set of refined match filter parameters, wherein the set of refined match filter parameters meets a correlation threshold of the correlator.

* * * * *